United States Patent
Koh et al.

(10) Patent No.: US 11,932,273 B2
(45) Date of Patent: *Mar. 19, 2024

(54) SYSTEMS AND METHODS FOR PROVIDING A SUGGESTED STEERING ACTION INDICATOR TO USER INTERFACE OF VEHICLE

(71) Applicant: Rivian IP Holdings, LLC, Plymouth, MI (US)

(72) Inventors: Wei Koh, Mountain View, CA (US); Hervé Cecchi, Santa Clara, CA (US); Steven Goodin, Sacramento, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,068

(22) Filed: Mar. 29, 2023

(65) Prior Publication Data

US 2023/0249708 A1 Aug. 10, 2023

Related U.S. Application Data

(63) Continuation of application No. 17/356,327, filed on Jun. 23, 2021, now Pat. No. 11,634,152.

(51) Int. Cl.
*B60W 50/16* (2020.01)
*B60K 35/00* (2006.01)
(Continued)

(52) U.S. Cl.
CPC ............. *B60W 50/16* (2013.01); *B60K 35/00* (2013.01); *B60W 30/0956* (2013.01); *B60W 40/04* (2013.01); *G06V 20/58* (2022.01); *B60K 35/23* (2024.01); *B60K 35/28* (2024.01); *B60K 35/29* (2024.01); *B60K 2360/178* (2024.01); *B60K 2360/179* (2024.01);
(Continued)

(58) Field of Classification Search
CPC .. B60W 50/16; B60W 30/0956; B60W 40/04; B60W 2554/801; B60W 2050/143; B60W 2050/146; G06V 20/58; B60K 35/00; B60K 2370/1529; B60K 2370/178; B60K 2370/1868; B60K 2370/179
See application file for complete search history.

(56) References Cited

U.S. PATENT DOCUMENTS 9,797,734 B2 10/2017 Mizutani et al.
2008/0106462 A1 5/2008 Shiraishi
(Continued)

FOREIGN PATENT DOCUMENTS

CN 101178437 A 5/2008
CN 111873990 A 11/2020

*Primary Examiner* — Chico A Foxx
(74) *Attorney, Agent, or Firm* — Haley Guiliano LLP

(57) ABSTRACT

Systems and methods are provided to provide a steering indicator to a driver of a vehicle. It is determined whether a first obstacle is in a forward path of the vehicle and whether a second obstacle is present at a side of the vehicle. In response to (a) determining the first obstacle is in the forward path and (b) determining whether the second obstacle is present at the one or more sides of the vehicle, a suggested steering action indicator indicating one or more movements for the vehicle to avoid the first obstacle is provided to a user interface of the vehicle.

20 Claims, 8 Drawing Sheets

(51) Int. Cl.
- *B60W 30/095* (2012.01)
- *B60W 40/04* (2006.01)
- *G06V 20/58* (2022.01)
- *B60W 50/14* (2020.01)

(52) U.S. Cl.
CPC .............. *B60K 2360/1868* (2024.01); *B60W 2050/143* (2013.01); *B60W 2050/146* (2013.01); *B60W 2554/801* (2020.02)

(56) References Cited

U.S. PATENT DOCUMENTS

| | | |
|---|---|---|
| 2009/0157247 A1 | 6/2009 | Sjoegren et al. |
| 2014/0244114 A1 | 8/2014 | Matsubara |
| 2014/0244142 A1 | 8/2014 | Matsubara |
| 2015/0353062 A1 | 12/2015 | Breuer et al. |
| 2016/0107643 A1 | 4/2016 | Mizutani et al. |
| 2016/0355180 A1 | 12/2016 | Urano et al. |
| 2017/0031017 A1* | 2/2017 | Jin ..................... G01S 13/931 |
| 2018/0281855 A1 | 10/2018 | Talamonti et al. |
| 2019/0143971 A1* | 5/2019 | Makled ............ G08G 1/096725 701/96 |
| 2020/0198660 A1 | 6/2020 | Bellet |
| 2021/0171023 A1 | 6/2021 | Shalev-Shwartz et al. |
| 2023/0076404 A1* | 3/2023 | Fuwa ................... B60W 40/04 |

\* cited by examiner

SYSTEMS AND METHODS FOR PROVIDING A SUGGESTED STEERING ACTION INDICATOR TO USER INTERFACE OF VEHICLE

CROSS-REFERENCE TO RELATED APPLICATION

This application is a continuation of U.S. patent application Ser. No. 17/356,327, filed Jun. 23, 2021, the disclosures of which is hereby incorporated by reference herein in its entirety.

INTRODUCTION

The design and assembly of automobiles may include various modules, e.g., traction control, Blind Spot Monitoring (BSM), Forward Collision Warning (FCW). BSM is a function that alerts a driver as to vehicles in the driver's blind spot. FCW is a function that aims to alert a driver of a vehicle in front of the driver's vehicle to allow the driver to avoid the vehicle. However, such BSM and FCW modules operate independently and the vehicle considers the outputs of such modules in isolation from each other.

SUMMARY

In accordance with the present disclosure, systems and methods are provided that provide a suggested steering action indicator to a user interface of a vehicle. Such systems and methods may determine (e.g., based on sensor data, determined by one or more sensors, about an environment surrounding the vehicle), whether a first obstacle is in a forward path of the vehicle; determine, based on the sensor data, whether a second obstacle is present at one or more sides of the vehicle; and in response to (a) determining the first obstacle is in the forward path and (b) determining whether the second obstacle is present at the one or more sides of the vehicle, provide a suggested steering action indicator to a user interface of the vehicle indicating one or more movements for the vehicle to avoid the first obstacle.

The environment surrounding the vehicle may be defined by a predetermined distance from the one or more sensors, and the second obstacle may be determined to be present at a first side of the one or more sides of the vehicle. In some embodiments, the suggested steering action indicator provided to the user interface indicates the one or more movements to a second clear side of the one or more sides of the vehicle to avoid the first obstacle and the second obstacle. The suggested steering action indicator may be provided as an audio indicator, a tactile indicator, or a visual indicator, or any combination thereof.

In some embodiments, a collision warning event may be determined in response to determining the first obstacle is in the forward path and in response to determining the vehicle cannot to slowed down to avoid the first obstacle. The suggested steering action indicator may be provided by causing display at the user interface of the one or more movements to avoid the first obstacle and the second obstacle.

In some embodiments, the one or more sensors comprise a first sensor and a second sensor, where the sensor data about the environment surrounding the vehicle used to determine a collision warning event is received from the first sensor, and the sensor data about the environment surrounding the vehicle used to determine whether the second obstacle is present at the one or more sides of the vehicle is received from the second sensor. The first sensor may be configured to determine a first distance from the first sensor to the first obstacle and the second sensor may be configured to determine a second distance from the second obstacle to the second sensor, where the first distance is longer than the second distance.

In some embodiments, the providing of the suggested steering action indicator to the driver of the vehicle to turn the vehicle towards a clear side of the one or more sides to avoid the first obstacle may comprise generating for output tactile feedback at a portion of the vehicle to indicate a suggested direction to turn the vehicle.

In some embodiments, the determination that the second obstacle is not present at the one or more sides of the vehicle comprises determining that the second obstacle is not present at a first side of the one or more sides of the vehicle, and determining that the second obstacle is not present at a second side of the one or more sides of the vehicle. The providing of the suggested steering action indicator to the user interface to turn the vehicle to avoid the first obstacle may comprise generating for display a first suggested direction to turn the vehicle and a second suggested direction to turn the vehicle, where the first suggested direction corresponds to the first side of the vehicle and the second direction corresponds to the second side of the vehicle.

In some embodiments, the determination that the second obstacle is not present at the one or more sides of the vehicle comprises determining that the second obstacle is not present at a first side of the one or more sides of the vehicle, and determining that the second obstacle is present at a second side of the one or more sides of the vehicle. The providing of the suggested steering action indicator to the user interface to turn the vehicle towards the first side to avoid the first obstacle and the second obstacle may comprise generating for display a suggested direction to turn the vehicle, where the suggested direction corresponds to the first side of the vehicle.

The suggested direction to turn the vehicle may be generated for display at a heads-up display at a portion of a windshield of the vehicle or at a graphical user interface of a dashboard of the vehicle, and the steering wheel of the vehicle may be moved in a suggested direction corresponding to the suggested steering action indicator. In some embodiments, the system may generate for display indications not to maneuver the vehicle to the respective locations of the first obstacle (e.g., in the forward path of the vehicle) and the second obstacle at the second side of the vehicle.

In some embodiments, the disclosed systems and methods may determine, based on input about an environment surrounding a vehicle received from one or more sensors, a collision warning event based on whether a first obstacle is present in a forward path of the vehicle; determine, based on the input, whether a second obstacle is present at a first side or a second side of the vehicle; in response to (a) determining the collision warning event and (b) determining that the second obstacle is not present at the second side of the vehicle: provide a suggested steering action indicator to a user interface of the vehicle to turn the vehicle towards the second side to avoid the first obstacle.

In some embodiments, a non-transitory computer-readable medium may be provided, where the non-transitory computer-readable medium comprises non-transitory computer-readable instructions encoded thereon that, when executed by a processor, causes the processor to determine a collision warning event based on whether a first obstacle is present in a forward path of the vehicle, determine whether an obstacle is present at a side of the vehicle, and in response to (a) determining the collision warning event and (b) determining that an obstacle is not present at the side of the vehicle: provide a suggested steering action indicator to a driver of the vehicle to turn the vehicle towards the side to avoid the first obstacle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
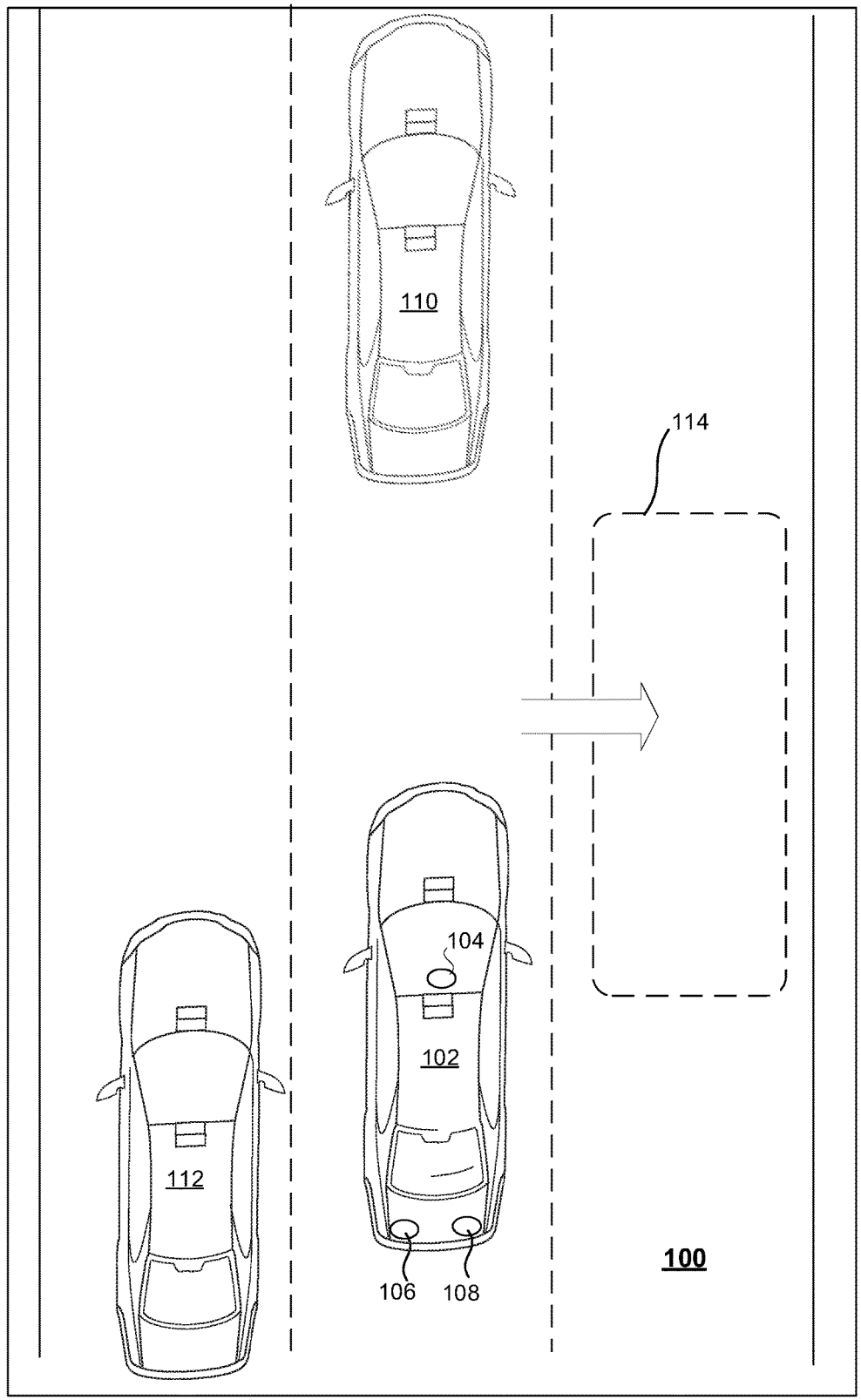
FIG. 1A shows an aerial view of an exemplary scenario in which a suggested steering action indicator may be provided to a user interface of a vehicle, in accordance with some embodiments of the present disclosure.
Figure 1B:
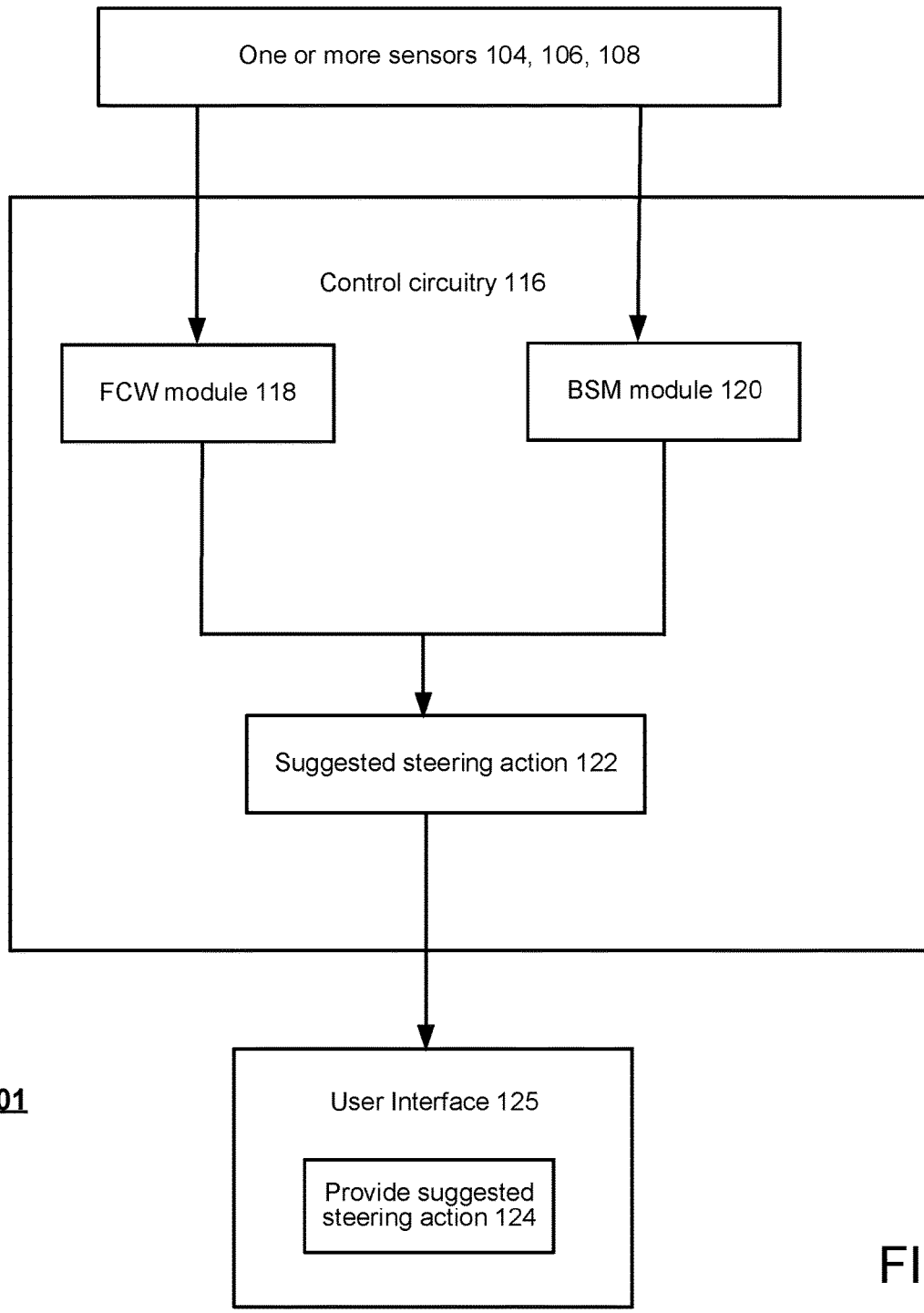
FIG. 1B shows a block diagram of components of a system for providing a steering action indicator to a user interface of a vehicle, in accordance with some embodiments of the present disclosure.

The present disclosure is directed to a smart collision avoidance system for improved techniques of providing indicators to a user interface of a vehicle, and more particularly to providing a suggested steering action indicator to a driver based on both a collision warning event with respect to a forward path of a vehicle and whether an obstacle is present at a side of the vehicle. FIG. 1A shows an aerial view of an exemplary scenario in which a suggested steering action indicator may be provided to user interface 125 of a vehicle, in accordance with some embodiments of the present disclosure, and FIG. 1B shows a block diagram of components of a system 101 for providing a steering action indicator to a user interface of vehicle 102, in accordance with some embodiments of the present disclosure. Vehicle 102 may be configured to provide suggested steering action indicator 124 to user interface 125 of vehicle 102 indicating one or more movements (e.g., turning vehicle 102 towards a position indicated at 114) for vehicle 102 to avoid an obstacle (e.g., vehicle 110). In some embodiments, vehicle 102 may be operated by a driver, and the driver may perform the one or more movements based on the suggested steering action indicator, or vehicle 102 may automatically perform the one or more movements associated with the suggested steering action indicator (e.g., upon determining the driver is unlikely to react in time). Vehicle 102 may be configured to integrate forward collision warning (FCW) and blind spot monitoring (BSM) functionality in an intelligent system, e.g., by coordinating processing performed based on inputs received from one or more sensors configured to monitor a forward path and left and right opposing sides of vehicle 102. For example, vehicle 102 may comprise one or more of sensors 104, 106, 108. Sensor 104 may be configured to detect the presence of an obstacle, e.g., vehicle 110, in a forward path of vehicle 102, and sensors 106 and 108 may be configured to detect the presence of an obstacle, e.g., vehicle 112, at or near respective sides (e.g., blind spots with respect to the driver) of a vehicle. Although multiple sensors are illustrated in the example of FIG. 1A, it should be appreciated that a single sensor may be employed, e.g., a rotating sensor mounted on a roof of vehicle 102 configured to detect obstacles in the environment surrounding vehicle 102. In some embodiments, the environment surrounding vehicle 102 is defined by a predetermined distance (e.g., 25 feet) from one or more of sensors 104, 106, 108. A first sensor (e.g., sensor 104) may be configured to determine a first distance from the first sensor to first obstacle 110, and a second sensor (e.g., sensor 106) may be configured to determine a second distance from the second sensor to second obstacle 112, where the first distance may be longer than the second distance.

As referred to herein, a blind spot should be understood to be an area in a vicinity of a vehicle that a driver has difficulty observing in his or her direct or peripheral vision while operating the vehicle, such as when the operator of the vehicle checks his or her rearview and side view mirrors. As referred to herein, an obstacle should be understood as another vehicle, structure, object (e.g., animate or inanimate), or topographical feature that is in a current path of a vehicle and that the vehicle is likely to collide with if the vehicle does not alter its trajectory (or is at a location within a path adjacent such that the vehicle is likely to collide with the obstacle if the vehicle alters its trajectory into such adjacent path). As referred to herein, a forward path in some circumstances may be understood as a path in front of the vehicle, which may be a straight line in front of the vehicle, or alternatively may be understood as a projected or predicted path in front of the vehicle as the vehicle navigates a curve or bend, e.g., determined based on one or more inputs received from sensors 104, 106, 108.

The one or more sensors 104, 106, 108 may be one or more of a variety of types, e.g., an image sensor, an ultrasonic sensor, a radar sensor, LED sensor, LIDAR sensor, etc., configured to measure the distance between vehicle 102 and an object in an environment surrounding vehicle 102 (e.g., by outputting a light or radio wave signal, and measuring a time for a return signal to be detected and/or measuring an intensity of the returned signal, and/or performing image processing on images captured by the image sensor of the environment surrounding vehicle 102). The one or more sensors may be disposed at one or more of a variety of locations on a frame of, and/or inside of, vehicle 102, e.g., sensor 104 may be disposed at a windshield of vehicle 102, at a front bumper of vehicle 102, a roof of vehicle 102, and sensors 106 and 108 may be located at a rear bumper of vehicle 102, a roof of vehicle 102, a windshield of vehicle 102, respective side view mirrors of vehicle 102, or any combination thereof.

As shown in FIG. 1A, vehicle 102 is travelling on a road, e.g., a highway, along a forward path towards vehicle 110 when the steering action indicator is presented to the driver. It should be appreciated that the steering action indicators of the present disclosure can be used with any type of vehicle on any type of terrain. For example, vehicle 102 may be a car (e.g., a coupe, a sedan, a truck, an SUV, a bus), a motorcycle, an aircraft (e.g., a drone), a watercraft (e.g., a boat), or any other type of vehicle.

Sensor 104 of vehicle 102 may receive input indicating that an obstacle, e.g., vehicle 110, is in a forward path of vehicle, determine and/or generate sensor data based on the input, and output the sensor data to control circuitry 116, as shown in FIG. 1B. Control circuitry 116 may determine, by way of FCW module 118 and based on the sensor data received from sensor 104, a collision warning event (e.g., an FCW event) based on determining that an obstacle, e.g., vehicle 110, is present in a forward path of vehicle 102. In some embodiments, control circuitry 116 may determine whether vehicle 102 may be slowed down (e.g., by the driver actuating a brake pedal of vehicle 102) to avoid colliding with obstacle 110, prior to determining that the collision warning event is occurring. For example, control circuitry 116 may obtain a speed of vehicle 102 (e.g., based on a speed reading from a speed sensor) and determine, based on the current speed of vehicle 102 and distance between vehicle 102 and obstacle 110, whether a collision with obstacle 110 can be avoided by slowing down vehicle 102. In some embodiments, control circuitry 116 may determine, based on input received by sensor 104, whether vehicle 110 is moving and a magnitude and direction of the motion, and this determination may be factored in the determination as to whether vehicle 102 may be slowed down in sufficient time to avoid vehicle 110. In some embodiments, the determined magnitude of the motion is relative motion between vehicle 102 and vehicle 110.

Control circuitry 116 may additionally determine, by way of BSM model 120 and based on the input received by one or more of sensors 106 and 108, whether an obstacle is present at a side of vehicle 110 (e.g., at one or more blind spots of vehicle 110). Such determination may occur prior to, substantially simultaneously with, or subsequent to, the collision warning event determination. In some embodiments, control circuitry 116 may determine that an obstacle is not present in one or more of the lanes adjacent to vehicle 104 (e.g., one or more of the lane or pathway to the right of the driver of vehicle 102 and the lane to the left of the driver of vehicle 102). On the other hand, control circuitry 116 may determine that an obstacle is present at the sides (e.g., respective blind spots) at one or more of the lanes or pathways adjacent to vehicle 104.

As referred to herein, determining whether an obstacle is present at a side of a vehicle may be understood as determining one or more of whether an obstacle is actually present adjacent to the vehicle, whether an obstacle is about to be actually present adjacent to the vehicle, and whether the vehicle can be turned toward that side and avoid such obstacle and/or other obstacles. For example, in determining whether an obstacle is about to be actually present adjacent to the vehicle, control circuitry 116 may determine based on sensor data from sensors 106 and/or 108 that, while an obstacle is not currently present in a lane adjacent to vehicle 102, an obstacle (e.g., a vehicle driving at a high speed) is accelerating in such lane and is predicted to be adjacent to vehicle 102 within a predetermined period of time (e.g., 5 seconds). In this circumstance, control circuitry 116 determines that an obstacle is present at a side of a vehicle, since control circuitry 116 determines that changing to the lane of the accelerating vehicle may result in vehicle 102 colliding with the accelerating vehicle, even if the accelerating vehicle may not be currently adjacent to vehicle 102.

As another example, in determining whether vehicle 102 can be turned toward a side and avoid an obstacle (e.g., vehicle 112) and/or other obstacles, such other obstacles may be an obstacle that is currently located ahead of vehicle 102, but in a lane or driving path adjacent to vehicle 102. For example, control circuitry 116 may determine (e.g., based on sensor data received from sensor 104) that the driver of vehicle 102 would need to immediately brake to avoid such other obstacles (e.g., another vehicle) that would be in front of vehicle 102 if vehicle 102 changed lanes to the adjacent lane. On the other hand, control circuitry 116 may determine that if vehicle 102 changed lanes to the other adjacent lane, no such other obstacles would be present in front of vehicle 102, and thus the other adjacent lane may be more preferable to maneuver vehicle 102 to.

If control circuitry 116 determines a collision warning event due to a first obstacle in front of vehicle 102, and control circuitry 116 determines that an obstacle is not present at one side (e.g., including the respective blind spot of the side) of vehicle 102, control circuitry 116 provides a suggested steering action indicator 124 to a driver of vehicle 102 (via user interface 125) to turn vehicle 102 one or more movements (e.g., to turn vehicle 102 towards the side) for vehicle 102 to avoid the first obstacle. In the example of FIG. 1A, suggested steering action indicator 124 suggests to the driver to maneuver vehicle 102 to position 114, e.g., due to the absence of a current or potential obstacle in the lane or driving path associated with position 114. If control circuitry 116 determines that, at each of the sides of vehicle 102, an obstacle is not currently present, or is not likely to be present in the near future, suggested steering action indicator 124 provided to the driver may indicate to the driver that vehicle 104 may be maneuvered to either of such lanes or driving paths to avoid obstacle 110.

Figure 2:
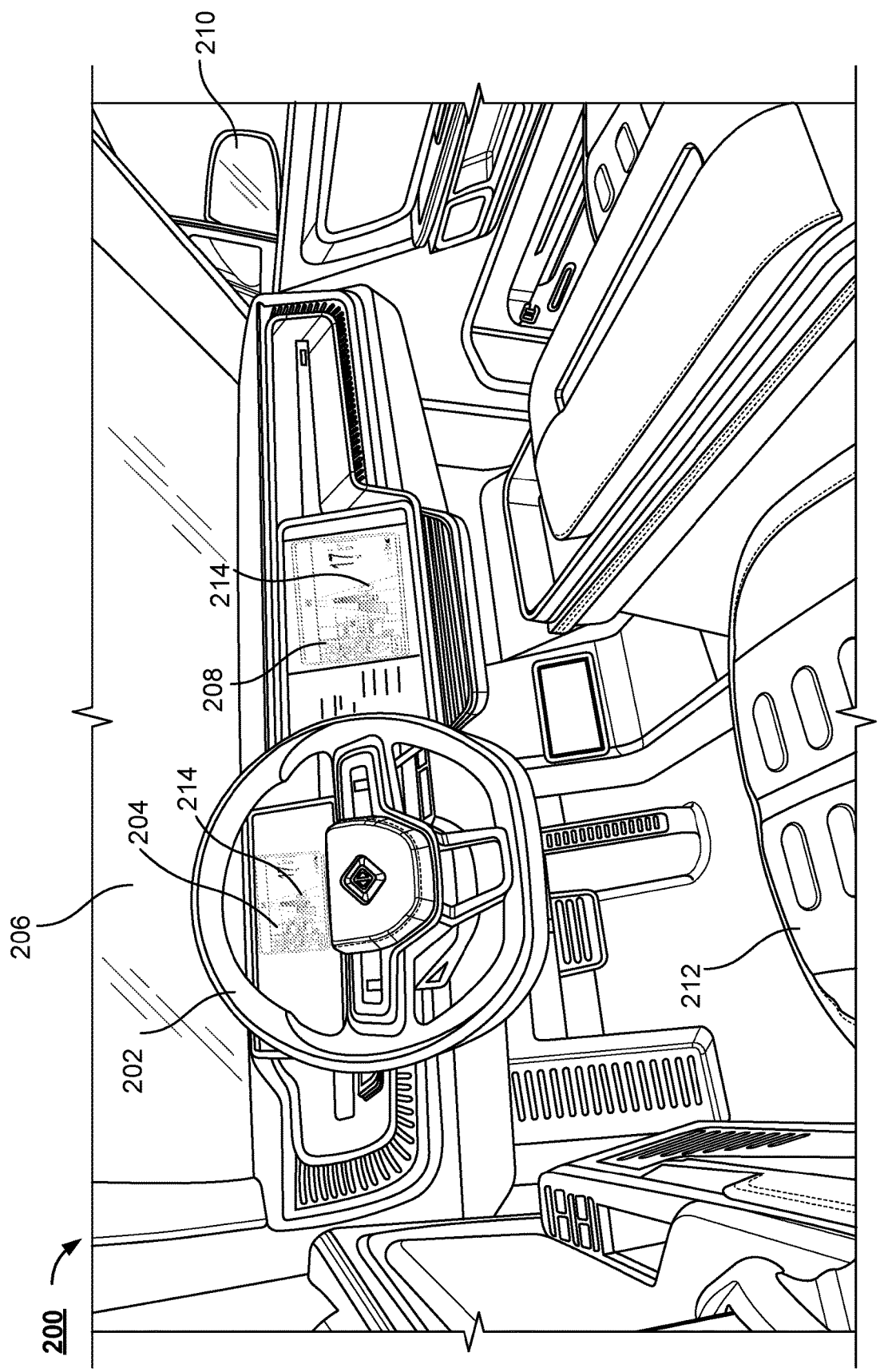
FIG. 2 shows an exemplary interior of a vehicle in which a suggested steering action indicator may be provided to a user interface of a vehicle, in accordance with some embodiments of the present disclosure.

FIG. 2 shows an exemplary interior of vehicle 102 of FIG. 1A in which a suggested steering action indicator may be provided to user interface 125 of vehicle 102, in accordance with some embodiments of the present disclosure. A vehicle interior or vehicle cabin 200 of vehicle 102 may comprise steering wheel 202, one or more dashboard displays 204 and/or 208, and driver seat 212. Vehicle 102 may further include windshield 206 disposed in front of the driver's seat, a right side rear view mirror 210, a left side rear view mirror (not shown) and a rear view mirror (not shown). Control circuitry 116 may be configured to generate for output a suggested steering action indicator 214 to a driver of vehicle 102 to recommend that the driver turn vehicle 102 towards the side to avoid an obstacle (e.g., vehicle 110 of FIG. 1A). In some embodiments, control circuitry 116 may generate for display the suggested steering action indicator 214 on one or more of a display of dashboard 204 and/or a display of dashboard 208 of vehicle 102 and/or a heads-up display at windshield 206. For example, as discussed in more detail in connection with FIG. 3, control circuitry 116 may generate for display a simulation of the environment surrounding vehicle 102 of FIG. 1A, which may comprise representations in 3D space of vehicle 102, vehicle 110, vehicle 112, and a suggested position on the road or driving path for the driver to maneuver vehicle 102 to avoid vehicle 110.

Additionally or alternatively, control circuitry 116 may be configured to generate for output audio indicators or alerts (e.g., to audibly draw the driver's attention to the suggested steering action) and/or other visual cues (e.g., conspicuous lighting patterns, such as flashing lights, in an effort to gain the driver's attention, such as at light sources located at one or more of steering wheel 202, dashboard 204, dashboard 208, a heads up display of windshield 206, left rear view mirror, right rear view mirror, the rear view mirror, cabin light, door light, etc.). The audio alerts may be in the form of speech-based instructions of which way to maneuver vehicle 102 and/or an alarm-type indicators (e.g., repetitive, high-pitched chimes intended to urgently capture the driver's attention). In some embodiments, control circuitry 116 may generate for output tactile or haptic indicators (e.g., to provide tactile or haptic feedback to a driver, e.g., on driver's seat 212, a passenger seat, steering wheel 202, brake pedals, and/or gas pedals). The tactile or haptic feedback may be provided at a position of vehicle 102 intended to indicate to the driver the suggested direction to maneuver vehicle 102. For example, a vibration on a left hand portion of steering wheel 202 and/or a left hand portion of the front seat may indicate to the driver a suggestion to maneuver vehicle 102 to the left to avoid an obstacle.

Figure 3:
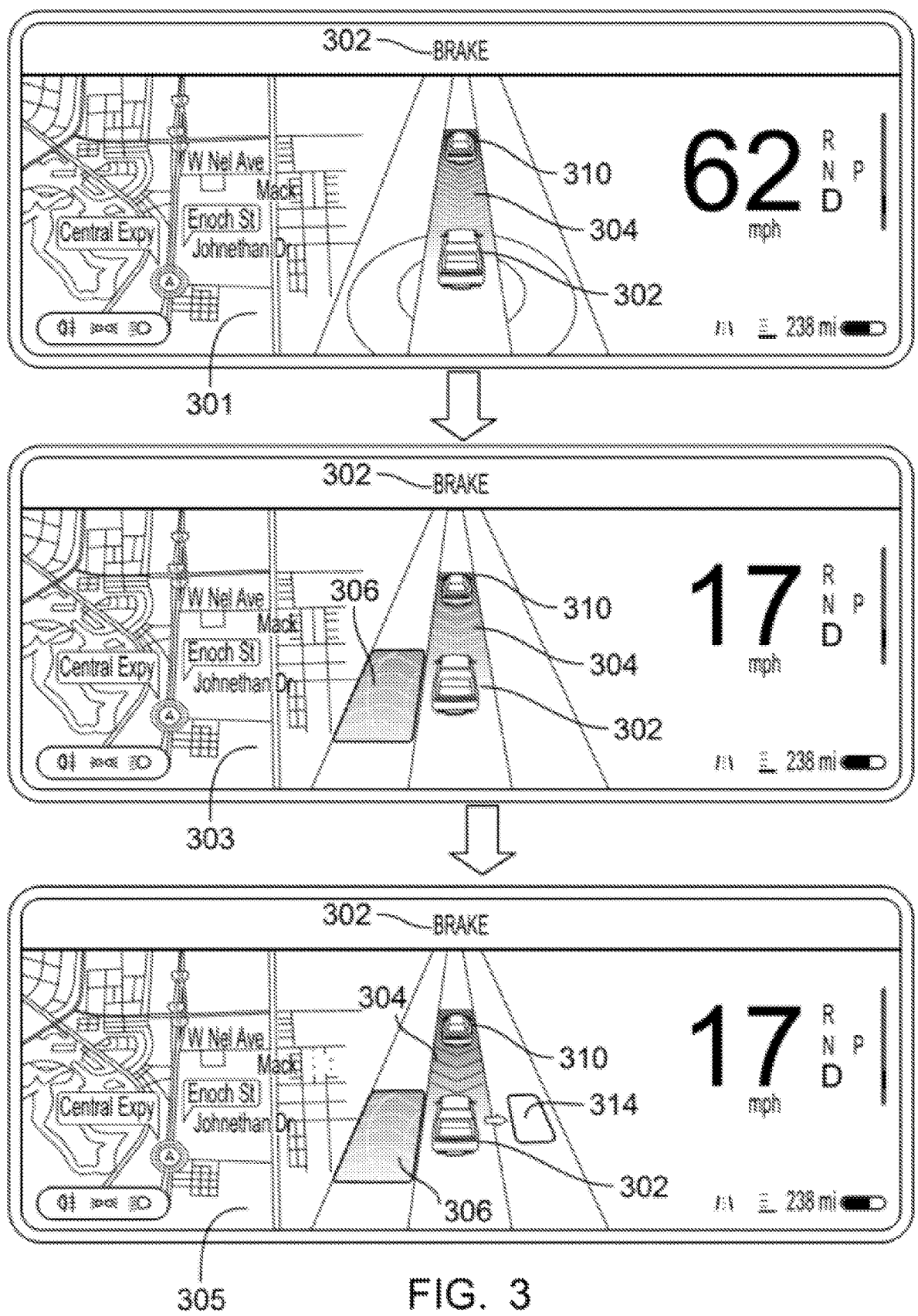
FIG. 3 shows an exemplary sequence of images generated for display to provide a suggested steering action indicator to a user interface of a vehicle, in accordance with some embodiments of the present disclosure.

FIG. 3 shows an exemplary sequence of images 300 generated for display to to provide a suggested steering action indicator to a user interface of a vehicle, in accordance with some embodiments of the present disclosure. Control circuitry 116 of FIG. 1B may be configured to generate for display graphical user interface (GUI) 301 (e.g., on a display at a dashboard 208 and/or heads-up display of a vehicle 206), and such display may be associated with a GPS system of vehicle 102. For example, control circuitry 116 may be configured to cause GUI 301 to comprise representation 302 of the driver's vehicle (e.g., vehicle 102 of FIG. 1A) and representation 310 of a detected obstacle (e.g., vehicle 110 of FIG. 1A) in a forward path of a vehicle. Control circuitry 116 may cause GUI 301 to comprise a visual indicator 302 suggesting that a driver brake to avoid the obstacle in the forward path of a vehicle (e.g., in response to detecting the obstacle based on input from one of more sensors 104, 106, 108).

As shown, GUI 301 may comprise icon 304, which may comprise a graduated color scheme to indicate different levels of urgency to a driver based on where vehicle 102 is depicted, e.g., a darker shade of red (or a color considered to be more noticeable to drivers) may indicate to the driver that vehicle 102 is closer to colliding with the detected obstacle, while a lighter shade of red (or a color considered to be less noticeable to drivers) may indicate to the driver that he or she is entering a range where he or she should be aware of obstacle 310.

In some embodiments, the nature of an indicator provided to the driver may be dependent on an urgency level associated with the indicator. For example, a subtle or generic indicator may be generated for display by the system if the system detects an obstacle but determines that a collision between vehicle 102 represented by icon 302 and obstacle represented by icon 310 is not imminent, while a more conspicuous indicator designed to capture the driver's attention may be generated for output by the system upon determining that a collision between a vehicle represented by icon 302 and an obstacle represented by icon 310 is imminent (e.g., if the driver does not take remedial action). Additionally or alternatively, the nature of other forms of indicators may similarly vary (e.g., rapidly repeating lights, or rapid vibrations via a haptic element in, and/or louder and more persistent tones in a more urgent situation).

GUI 303 may represent another image in the sequence of images 300. GUI 303 depicts an indication that control circuitry 116 has determined, based on sensor data received from one or more sensors 104, 106, 108, that an obstacle represented by icon 306 is present at a left-hand side of vehicle 102. In some embodiments, a more urgent indicator (e.g., recommending the driver actuate the brake) may be provided to the driver at GUI 303 as compared to the indicator at 301, due to control circuitry 116 determining that the distance between vehicle 102 and the obstacle represented by icon 310 is decreasing, and that the presence of the obstacle represented by icon 306 limits the driver's options in terms of avoiding obstacle 306 (e.g., the driver may now not be able to maneuver vehicle 102 to the left to avoid obstacle 110). In some embodiments, control circuitry 116 may determine, based on sensor data from one or more sensors 104, 106, 108, that an obstacle is present on each side of vehicle 102, and may depict an indication of this on GUI 303 with icons on respective sides of icon 302.

GUI 305 may represent another image in the sequence of images 300. As shown, control circuitry 116 may cause GUI 305 to comprise icon 314 representing a position associated with a suggested steering action (e.g., position 114 of FIG. 1A). The suggested steering action may be provided to indicate to the driver that he or she is able to maneuver vehicle 102 of FIG. 1A (represented by icon 302) in a direction where no obstacles have been detected (e.g., to the right of a current position of vehicle 102). For example, indicia (e.g., an arrow) may be provided on GUI 305 in a particular manner (e.g., a green color, optionally accompanied by text and/or audio and/or tactile feedback) suggesting the action is desirable, whereas icons 304, 306 may be presented in a manner (e.g., a red color, optionally accompanied by text and/or audio and/or tactile feedback) indicating that it would not be desirable to maneuver the driver's vehicle towards the position represented by icon 306.

In some embodiments, indicator 314 may be generated for display when the system determines that there is not sufficient time to avoid colliding with the obstacle represented by icon 310 (e.g., based on the distance between the driver's vehicle and the vehicle in the forward path of the vehicle and the respective speeds of such vehicles), in order to provide the driver with a route to avoid a collision by changing direction into a lane or driving path that is free of obstacles. In some embodiments, the system may cause visual indicator 302 to be generated for display (e.g., to minimize impact a potential collision, even if collision cannot be avoided by braking alone), along with the suggested steering action indicator.

Figure 4:
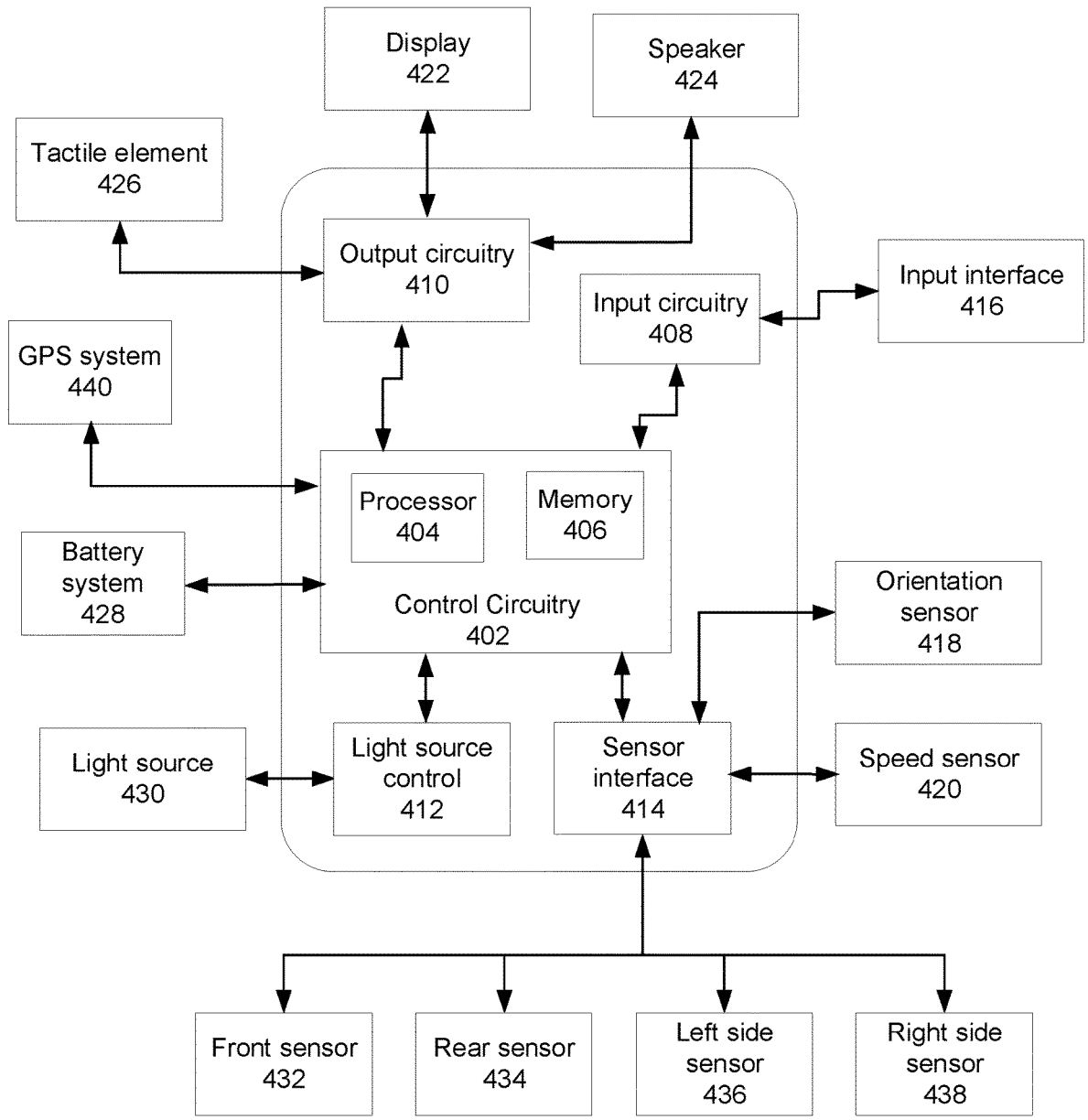
FIG. 4 shows a block diagram of components of a system of a vehicle for providing a steering action indicator to a user interface of the vehicle, in accordance with some embodiments of the present disclosure.

FIG. 4 shows a block diagram of components of a system of a vehicle 400 for providing a steering action indicator to a user interface of a vehicle, in accordance with some embodiments of the present disclosure. Vehicle 400 may correspond to vehicle 102 of FIG. 1A. Vehicle 400 may be a car (e.g., a coupe, a sedan, a truck, an SUV, a bus), a motorcycle, an aircraft (e.g., a drone), a watercraft (e.g., a boat), or any other type of vehicle.

Vehicle 400 may comprise control circuitry 402 which may comprise processor 404 and memory 406. Control circuitry 402 may correspond to control circuitry 116 of FIG. 1B. Processor 404 may comprise a hardware processor, a software processor (e.g., a processor emulated using a virtual machine), or any combination thereof. In some embodiments, processor 404 and memory 406 in combination may be referred to as control circuitry 402 of vehicle 400. In some embodiments, processor 404 alone may be referred to as control circuitry 402 of vehicle 400. Memory 406 may comprise hardware elements for non-transitory storage of commands or instructions, that, when executed by processor 404, cause processor 404 to operate the vehicle 400 in accordance with embodiments described above and below. Control circuitry 402 may be communicatively connected to components of vehicle 400 via one or more wires, or via wireless connection.

Control circuitry 402 may be communicatively connected to input interface 416 (e.g., a steering wheel, a touch screen on display 424, buttons, knobs, a microphone or other audio capture device, etc.) via input circuitry 408. In some embodiments, a driver of vehicle 400 may be permitted to select certain settings in connection with the operation of vehicle 400 (e.g., color schemes of the urgency levels of FIG. 3, manners of presentation of the suggested steering action indicator, when to provide the suggested steering action indicator, etc.). In some embodiments, control circuitry 402 may be communicatively connected to GPS system 440 of vehicle 400, where the driver may interact with the GPS system via input interface 416. GPS system 440 may be in communication with multiple satellites to ascertain the driver's location and provide navigation directions to control circuitry 402.

Control circuitry 402 may be communicatively connected to display 422 and speaker 424 by way of output circuitry 410. Display 422 may be located at a dashboard of vehicle 400 (e.g., dashboard 204 and/or dashboard 208 of FIG. 2) and/or a heads-up display at a windshield (e.g., windshield 206 of FIG. 2) of vehicle 400. For example, the GUIs of FIG. 3 may be generated for display at display 422, and display 422 may comprise an LCD display, an OLED display, an LED display, or any other type of display. Speaker 424 may be located at any location within the cabin of vehicle 400, e.g., at the dashboard of vehicle 400, on an interior portion of the vehicle door. Display 422 and speaker 424 may provide visual and audio feedback, respectively, in connection with providing a suggested steering action indicator to a driver of vehicle 400 via user interface indicating one or more movements (e.g., to turn vehicle 400 towards a side) for vehicle 400 to avoid an obstacle. In some embodiments, user interface 125 of FIG. 1B may correspond to one or more of display 422, speaker 424, tactile element 426.

Control circuitry 402 may be communicatively connected to tactile element 426 via output circuitry 410. Tactile element 426 may be a mechanical device, e.g., comprising actuators configured to vibrate to cause a tactile or haptic sensation of the body of the driver. The tactile element may be located at one or more of a variety of locations in vehicle 400 (e.g., on driver's seat 212 of FIG. 2, a passenger seat, steering wheel 202 of FIG. 2, brake pedals, and/or gas pedals) to provide haptic feedback in connection with providing a suggested steering action indicator to user interface 125 (and a driver of vehicle 400) indicating one or more movements (e.g., to turn vehicle 400 towards the side) for vehicle 400 to avoid the first obstacle. In some embodiments, control circuitry 402 may cause steering wheel 202 to be moved automatically in a manner corresponding to the suggested steering action (e.g., to turn in the direction indicated by the suggested steering action). For example, one or more sensors (e.g., front sensor 432, rear sensor 434, left side sensor 436, right side sensor 438, orientation sensor 418, speed sensor 420) may determine sensor data indicative of the driver of vehicle not paying attention (e.g., vehicle 400 drifting into an adjacent lane) or not braking when prompted, and control circuitry 402 may take corrective action to control steering wheel 202 in accordance with the one or more movements associated with the suggested steering action indicator. As another example, vehicle 400 may be a driverless vehicle, and control circuitry may cause steering wheel 202 (or other input mechanism) to turn vehicle 400 in accordance with a direction associated with the suggested steering action indicator.

Control circuitry 402 may be communicatively connected (e.g., by way of sensor interface 414) to sensors (e.g., front sensor 432, rear sensor 434, left side sensor 436, right side sensor 438, orientation sensor 418, speed sensor 420). Orientation sensor 418 may be an inclinometer, an accelerometer, a tiltmeter, any other pitch sensor, or any combination thereof and may be configured to provide vehicle orientation values (e.g., vehicle's pitch and/or vehicle's roll) to control circuitry 402. Speed sensor 420 may be one of a speedometer, a GPS sensor, or the like, or any combination thereof, and may be configured to provide a reading of the vehicle's current speed to control circuitry 402.

In some embodiments, front sensor 432 may correspond to sensor 104 of FIG. 1A, and sensors 434, 436, 438 may correspond to one or more of sensors 106 and 108 of FIG. 1A, employed by vehicle 400 to provide a suggested steering action indicator to a driver of vehicle 400 to turn vehicle 400 towards the side to avoid the first obstacle. As discussed above, such sensor may be positioned at a variety of locations of vehicle 400, and may be one or more of a variety of types, e.g., an image sensor, an ultrasonic sensor, a radar sensor, LED sensor, LIDAR sensor, etc., configured to measure the distance between vehicle 400 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 400).

Control circuitry 402 may be communicatively connected to battery system 428, which may be configured to provide power to one or more of the components of vehicle 400 during operation. In some embodiments, vehicle 400 may be an electric vehicle or a hybrid electric vehicle.

Control circuitry 402 may be communicatively connected to light source 430 via light source control 412. Light source 430 may be, e.g., a series of LEDs, and may be located at one or more of a variety of locations in vehicle 400 (e.g., steering wheel 202 of FIG. 2, dashboard 204 of FIG. 2, dashboard 208 of FIG. 2, a heads up display of windshield 206 of FIG. 2, left rear view mirror, right rear view mirror 210 of FIG. 2, the rear view mirror, cabin light, door light, etc.) to provide visual feedback in connection with providing suggested steering action indicator to a driver of vehicle 400 to turn vehicle 400 towards a side to avoid the first obstacle.

It should be appreciated that FIG. 4 only shows some of the components of vehicle 400, and it will be understood that vehicle 400 also includes other elements commonly found in vehicles (e.g., electric vehicles), e.g., a motor, brakes, wheels, wheel controls, turn signals, windows, doors, etc.

Figure 5:
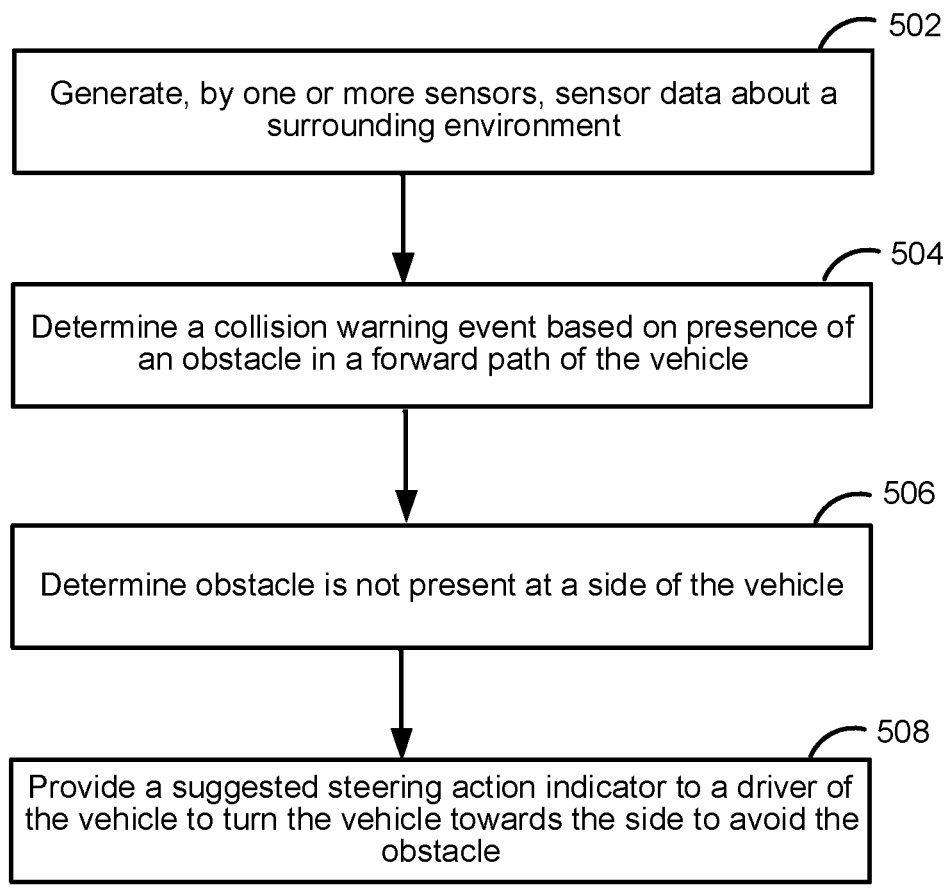
FIG. 5 shows a flowchart of an illustrative process for providing a suggested steering action indicator to a driver, in accordance with some embodiments of the present disclosure.

FIG. 5 is an illustrative flowchart of a process 500 for providing a suggested steering action indicator to a driver, in accordance with some embodiments of the disclosure. Process 500 may be executed by control circuitry (e.g., control circuitry 116 of FIG. 1B, which may correspond to control circuitry 402 of FIG. 4) of a vehicle (e.g., vehicle 102 of FIG. 1A which may correspond to vehicle 400 of FIG. 4).

At 502, control circuitry (e.g., control circuitry 116 of FIG. 1B) of a vehicle (e.g., vehicle 102 of FIG. 1A) receives input from one or more sensors (e.g., sensors 104, 106, and/or 108 of FIG. 1A) about a surrounding environment of vehicle 102. For example, the one or more sensors 104, 106, and/or 108 may capture an image of the environment in a forward path of vehicle 102, as well as an image at each side of vehicle 102 (e.g., which may include respective blind spots of vehicle 102 with respect to the driver).

At 504, control circuitry 116 (e.g., by way of FCW module 118 of FIG. 1A) may determine a collision warning event based on the presence of an obstacle in a forward path of vehicle 102. For example, to determine the collision warning event, control circuitry 116 may compute a distance from an obstacle (e.g., vehicle 110 of FIG. 1A) in the forward path of vehicle 102, based on the image captured by the one or more sensors, and determine a current speed of vehicle 102 (e.g., obtained from speed sensor 420 of FIG. 4) and/or the speed of the obstacle (e.g., based on analyzing captured images of the obstacle). Based on the computed distance and the one or more speeds of vehicle 102 and obstacle 110, control circuitry 116 may determine whether vehicle 102 is likely to collide with obstacle 110. In some embodiments, control circuitry 116 may obtain data from one or more sensors 104, 106, 108 periodically (e.g., a predetermined number of times per second).

At 506, control circuitry 116 may determine an obstacle (e.g., another vehicle) is not present at a side of vehicle 102. For example, control circuitry 116 may determine, based on images captured by one or more sensors 104, 106, 108 that no obstacle currently exists (nor is likely to exist in the near future) with respect to vehicle 102 on a particular side of vehicle 102.

At 508, control circuitry 116 may provide a suggested steering action indicator (e.g., indicator 124 of FIG. 1, indicator 214 of FIG. 2, indicator 314 of FIG. 3) to a driver of vehicle 102 to turn vehicle 102 towards a side to avoid the obstacle (e.g., obstacle 110 of FIG. 1A). In some embodiments, suggested steering action indicator 314 may be generated for display (e.g., at a display 422 of FIG. 4 of vehicle 400, which may correspond to vehicle 102 of FIG. 1) to indicate a recommendation that the driver maneuver vehicle 102 to a position determined to lack an obstacle (e.g., position 114 of FIG. 1A). Suggested steering action indicator 314 may, for example, comprise a graphical indicator (e.g., in the form of an arrow in a particular color directed towards the recommended position to maneuver the vehicle).

It will be understood that process 500 is merely illustrative and various modifications can be made within the scope of the disclosure. For example, in some embodiments, control circuitry 116 at 506 may check whether obstacles are present at both sides of vehicle 102. If control circuitry 116 determines that no obstacles exist at both sides, control circuitry 116 may provide an indication of this (e.g., arrows directed to both sides to avoid the obstacle in the forward path) to the driver. If control circuitry 116 determines an obstacle exists at both sides, control circuitry 116 may provide an indication of this (e.g., a visual indicator of high urgency) to the driver.

Figure 6:
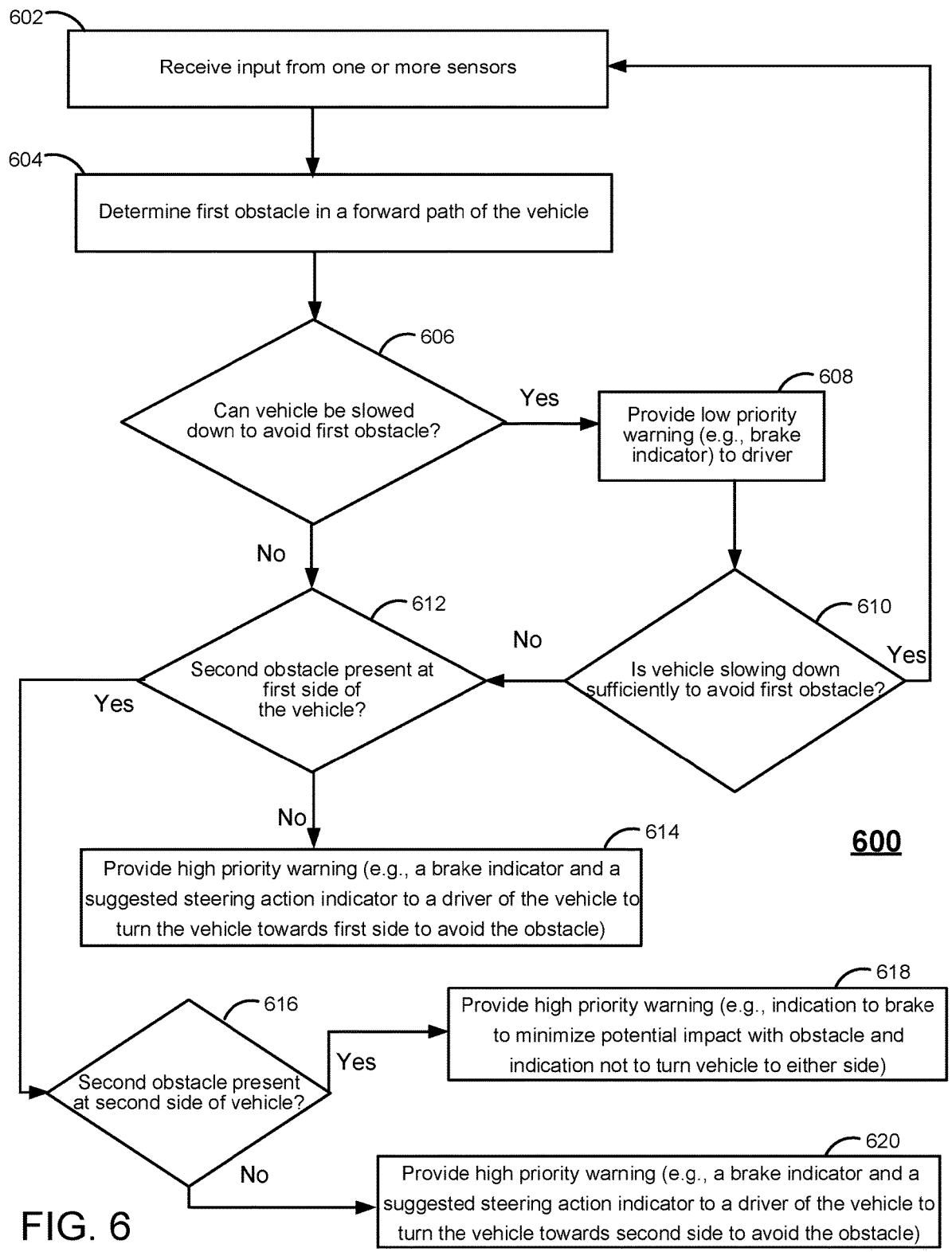
FIG. 6 shows a flowchart of an illustrative process for providing two priority levels of warning to a user interface of a vehicle, in accordance with some embodiments of the present disclosure.

FIG. 6 is an illustrative flowchart of a process 600 for providing two priority levels of warning to a user interface of a vehicle, in accordance with some embodiments of the disclosure. Process 600 may be executed by control circuitry (e.g., control circuitry 116 of FIG. 1B, which may correspond to control circuitry 402 of FIG. 4) of a vehicle (e.g., vehicle 400 of FIG. 4 which may correspond to vehicle 102 of FIG. 1A).

At 602, control circuitry 116 of vehicle 102 receives input from one or more sensors (e.g., sensors 104, 106, and/or 108 of FIG. 1A) about an environment surrounding vehicle 102. 602 of FIG. 6 may be performed in a similar manner as 502 of FIG. 5.

At 604, control circuitry 116 may determine a collision warning event based on the presence of a first obstacle (e.g., vehicle 110 of FIG. 1A) in a forward path of vehicle 102. 604 of FIG. 6 may be performed in a similar manner as 504 of FIG. 5.

At 606, control circuitry 116 may determine whether vehicle 102 can be slowed down to avoid obstacle 110. Control circuitry 116 may perform this determination based on a distance between the vehicle and obstacle 110 (e.g., computed based on the captured images of the obstacle), and a current speed of the vehicle and/or a speed of obstacle 110. Processing may proceed to 612 if control circuitry 116 determines that vehicle 102 cannot be slowed down to avoid the obstacle.

At 608, in response to control circuitry 116 determining that vehicle 102 may be slowed down (e.g., by the driver actuating a brake pedal or vehicle otherwise causing the vehicle to slow down) to avoid obstacle 110, control circuitry 116 may provide a low priority warning (e.g., an indication 302 of FIG. 3 to the driver to brake), in combination with a representation of the obstacle (e.g., represented by 310 of FIG. 3) and a graduated urgency indicator (e.g., icon 304 of FIG. 3). In some embodiments, the low priority warning may additionally or alternatively comprise an audio indicator (e.g., a tone of low to moderate volume) or a tactile indicator (e.g., vibrations of low to moderate intensity).

At 610, control circuitry 116 may determine whether vehicle 102 is slowing down sufficiently to avoid obstacle 110, e.g., whether the driver actuated the brake pedal or released the gas pedal after being provided with the low priority warning. If control circuitry 116 determines vehicle 102 is sufficiently slowing down to avoid obstacle 110, processing may return to 602. If control circuitry 116 determines vehicle 102 is not sufficiently slowing down to avoid obstacle 110, processing may proceed to 612. In some embodiments, vehicle 102 may intervene upon determining the driver of vehicle 102 is not braking sufficiently to avoid first obstacle 110.

At 612, control circuitry 116 may determine whether a second obstacle is present at a side of the vehicle (e.g., a left side of the vehicle relative to the driver). If control circuitry 116 determines, based on input from one or more sensors (e.g., sensor 106 of FIG. 1A) that a second obstacle (e.g., vehicle 112 of FIG. 1A) is present on a first side of the vehicle, processing may proceed to 616. On the other hand, if control circuitry 116 determines based on input from one or more sensors (e.g., sensor 108 of FIG. 1A) that an obstacle is not present on the first side of the vehicle (e.g., in the event the first side is the right side of the vehicle), processing may proceed to 614.

At 614, control circuitry 116 may provide a high priority warning, e.g., comprising icon 314 of FIG. 3 of suggested steering action indicator 314 to a driver of vehicle 102 to turn the vehicle towards the side (determined not to have an obstacle) to avoid obstacle 110, a brake indicator 302 of FIG. 3, and may additionally provide one or more of high-volume and/or high-frequency audio indicator, a high-intensity and/or high frequency haptic alert.

At 616, control circuitry 116 may determine whether an obstacle is present at a second side (e.g., the opposite side of the vehicle as compared to the first side of the vehicle analyzed at 612), based on input from one or more sensors (e.g., sensors 104, 106 and/or 108). If such obstacle is detected, processing proceeds to 618; if such obstacle is not detected, processing proceeds to 620.

At 618, control circuitry 116 may provide a high priority warning to the driver based on the determination that at obstacle is present at each side of the vehicle. For example, control circuitry 116 may provide one or more indicators (e.g., audio, visual and/or haptic, of an urgent nature) to urge the driver to brake in an effort to minimize impact with the first obstacle (e.g., obstacle 110). For example, such indicators may be provided based on the assumption that colliding with an obstacle at a front of the vehicle at a reduced speed may be preferable to swerving into another lane and colliding with an obstacle in that lane.

At 620, in response to determining that a second obstacle obstacle is not present at the second side of vehicle 102 (e.g., a clear side of the vehicle which corresponds to the opposite side of the vehicle as compared to the side of the vehicle analyzed at 612), processing may be performed in a similar manner as at 614, except that the suggested steering action indicator recommends the driver to maneuver to such second side (e.g., the opposite side of the vehicle as compared to the side of the vehicle analyzed at 612).

It will be understood that process 600 is merely illustrative and various modifications can be made within the scope of the disclosure. For example, control circuitry 116 may determine whether an obstacle is present at each of the left-hand side and right-hand side of vehicle 102 with respect to the driver of vehicle 102, and in response to making such a determination, control circuitry 116 may cause a suggested steering action indicator to be displayed at both sides (e.g., to notify the driver that obstacle 110 can be avoided via multiple directions). In some embodiments, control circuitry 116 may take into account potential obstacles in the new lane or driving path that is suggested for vehicle 102 to maneuver into. For example, based on sensor data generated by one or more sensors (e.g., sensor 104 of FIG. 1A), control circuitry 116 may determine that, while the driver can avoid obstacle 110 by switching to the left lane from the middle lane, another obstacle is present in the left lane that would require the driver to brake to avoid once the driver switches lanes, whereas no such obstacle is present in the right lane and the driver may also avoid obstacle 110 by switching to the right lane. Accordingly, control circuitry 116 may provide an indicator to the driver that, while obstacle 110 can be avoided in either lane, it may be preferable to maneuver vehicle 102 to the right lane (e.g., since the driver would not have to brake in the right lane but rather may maintain speed or accelerate without colliding with any other obstacles).

Figure 7:
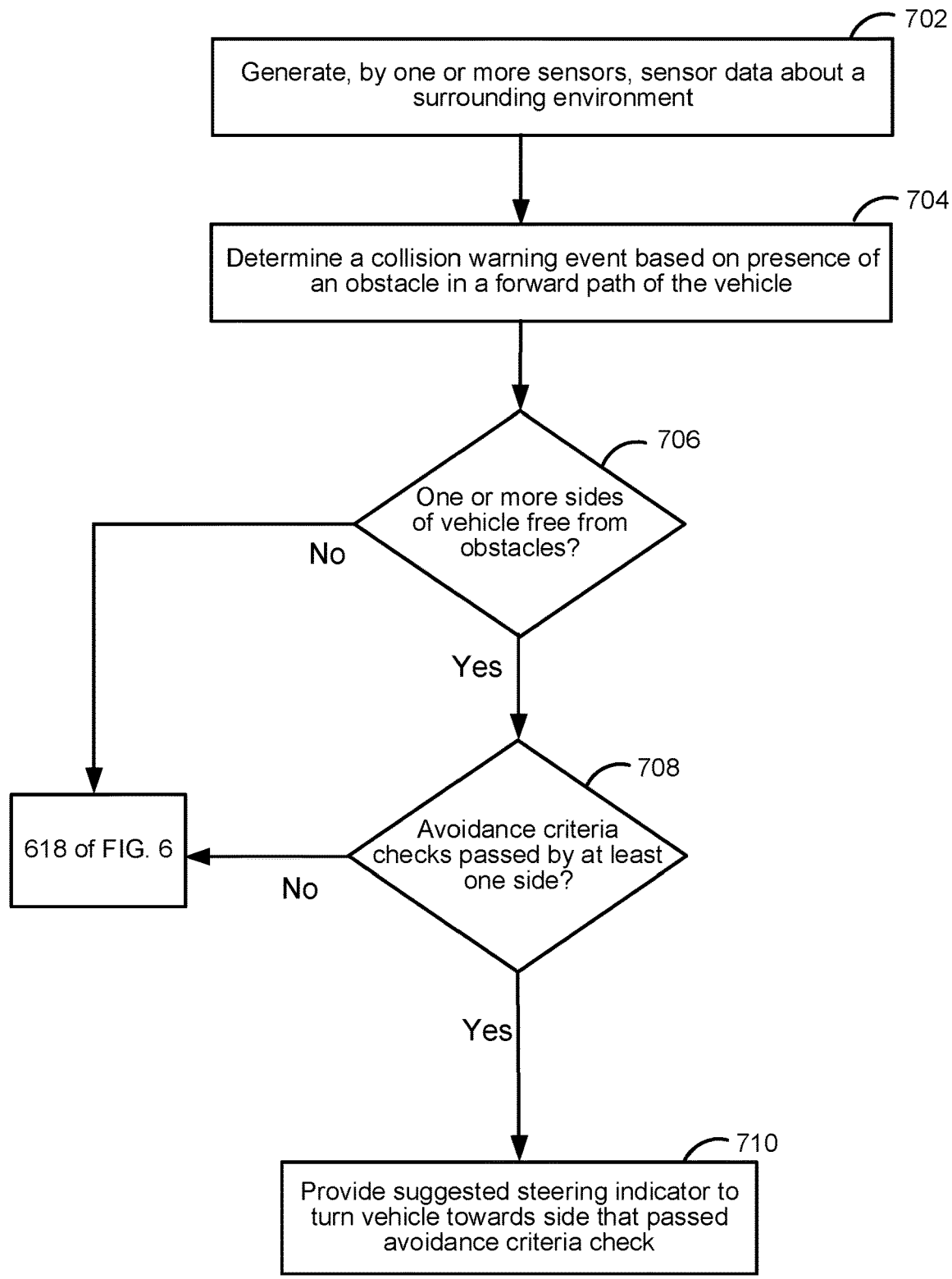
FIG. 7 shows a flowchart of an illustrative process for performing avoidance criteria checks prior to providing a suggested steering action indicator to a user interface of a vehicle, in accordance with some embodiments of the present disclosure.

FIG. 7 is an illustrative flowchart of a process 700 for performing avoidance criteria checks prior to providing a suggested steering action indicator to a user interface of a vehicle, in accordance with some embodiments of the present disclosure. Process 700 may be executed by control circuitry (e.g., control circuitry 116 of FIG. 1B, which may correspond to control circuitry 402 of FIG. 4) of a vehicle (e.g., vehicle 400 of FIG. 4 which may correspond to vehicle 102 of FIG. 1A).

At 702, control circuitry 116 of vehicle 102 receives sensor data generated by, for example, one or more sensors 104, 106, and/or 108 about a surrounding environment of vehicle 102. 702 of FIG. 7 may be performed in a similar manner as 602 of FIG. 6 and 502 of FIG. 5.

At 704, control circuitry 116 (e.g., by way of FCW module 118 of FIG. 1A) may determine a collision warning event based on the presence of an obstacle in a forward path of vehicle 102. 704 of FIG. 7 may be performed in a similar manner as 604 of FIGS. 6 and 504 of FIG. 5.

At 706, control circuitry 116 may determine whether one or more sides (e.g., at least one, or both, of the left and right sides) of vehicle 102 are free from obstacles. If control circuitry 116 determines, based on input from one or more sensors 104, 106 and/or 108 that neither side of the vehicle is free from obstacles (e.g., a vehicle is present on both sides of the vehicle), processing may proceed to 618 of FIG. 6. On the other hand, if control circuitry 116 determines based on input from sensors 104, 106 and/or 108 that obstacles are not present on at least one of the left or right sides of vehicle 102, processing may proceed to 708.

In some embodiments, control circuitry 116 may employ one or more of a variety of techniques in determining whether an obstacle is present at the left-hand and/or right-hand side of vehicle 102. For example, control circuitry 116 may determine, based on sensor data received from one or more of sensors 104, 106, and/or 108, a distance between two vehicles each located in an adjacent lane, where one of such vehicles is a forward vehicle (at a position that is ahead of vehicle 102, in the adjacent lane) that is in front of the other of the vehicles which is a rear vehicle (behind or at the side of vehicle 102 in the adjacent lane). Additionally or alternatively, control circuitry 116 may determine one or more of the respective speeds of the forward and rear vehicles, a closing speed as between the forward and rear vehicles, and take into account such determinations when determining whether an obstacle is present. For example, control circuitry 116 may determine that an obstacle is present at a particular side of vehicle 102 if, based on a current speed of vehicle 102, a computed distance between the front and rear vehicles at the particular side, and speeds of the front and rear vehicles, there is not enough space between the front and rear vehicles in a lane at that particular side to allow vehicle 102 to maneuver into such lane while avoiding the front and rear vehicles.

At 708, control circuitry 116 may perform one or more avoidance criteria checks, prior to providing suggested steering action indicator 214 to the driver of vehicle 102. Such avoidance criteria checks may be used to determine that, even if one or more sides of vehicle 102 is free from obstacles, there may be other factors that impact whether to provide a suggested steering action indicator to suggest the driver maneuver vehicle 102 to a particular side, or even if both sides of vehicle 102 are free from obstacles, it may be preferable to suggest the driver maneuver to one side instead of the other side. In some embodiments, the avoidance criteria checks may be incorporated into the obstacle determination at 706 itself.

Avoidance criteria checks may be any suitable evaluation of a side of vehicle 102. For example, control circuitry 116 may determine whether one side of vehicle 102, determined as being free from obstacles, corresponds to a lane of on-coming traffic. Control circuitry 116 may make this determination based on GPS data and/or sensor data generated by sensors 104, 106 and/or 108. For example, if vehicle 102 is traveling in the left lane, control circuitry 116 may determine that the lane adjacent to vehicle 102 to the left-hand side is a lane of on-coming traffic where vehicles travel in the opposite direction to the direction vehicle 102 is currently traveling. Control circuitry 116 may determine that, while an obstacle may not have been determined to be currently present in such on-coming traffic lane, it may be preferable to suggest the driver to turn towards the other side of vehicle 102 (e.g., which may be another lane free from obstacles, or a shoulder of the road on the right-hand side of vehicle 102 that another vehicle is less likely to enter or be present at).

In some embodiments, this determination may be impacted by a current speed limit and/or type of road vehicle 102 is on. For example, if control circuitry 116 determines vehicle 102 is on a local road with a low speed limit (e.g., below a threshold, such as 40 MPH), control circuitry 116 may determine that suggesting vehicle 102 momentarily maneuver to an on-coming traffic lane to avoid vehicle 110 on such a road may be acceptable, and such determination may contribute to passing the avoidance criteria check. On the other hand, if control circuitry 116 determines vehicle 102 is on a multi-lane highway road with a high speed limit (e.g., above a threshold, such as 45 MPH), control circuitry 116 may determine that it is not desirable to maneuver into an on-coming traffic lane (e.g., since a vehicle could turn into such lane, or the driver of vehicle 102 may have difficulty returning vehicle 102 to the correct lane after swerving), thereby failing the avoidance criteria check.

Control circuitry 116 may alternatively or additionally perform other avoidance criteria checks. For example, control circuitry 116 may determine based on sensor data and/or GPS data that, while a particular side of vehicle 102 is free from obstacles, there are other considerations associated with such a side, e.g., the side is a shoulder of a road that is ending; the side is in a school zone and a current time of day and day of the week indicates school is in session; the current road vehicle 102 is traveling on has a high elevation in a mountainous region; the side is near the edge of a cliff or a body of water; the side is near bridge or a tunnel entrance, etc. In these circumstances, such side may be determined to fail the avoidance criteria check, e.g., because it may be preferable to provide an indication to actuate the brake of vehicle 102 and remain in a current lane, at 618 of FIG. 6, rather than maneuver to a side where there may be more uncertainty.

As another example, control circuitry 116 may determine that another vehicle is currently behind vehicle 102 but has a turn signal on, indicating such vehicle is likely changing to a lane adjacent to vehicle 102, which may enhance the likelihood that such vehicle is to become an obstacle in the adjacent lane. In this circumstance, control circuitry 116 may determine that this lane fails the avoidance criteria check. As another example, if control circuitry 116 determines (e.g., based on GPS and/or sensor data) that an adjacent lane to vehicle 102 is a right lane of a highway, control circuitry 116 may determine that this enhances the likelihood of another vehicle turning onto an on-ramp to enter the adjacent lane to vehicle 102. Thus control circuitry 116 may recommend turning the vehicle to the other adjacent lane Additionally of alternatively, control circuitry 116 may determine that vehicle 102 is traveling on a highway having at least three lanes, and thus it may be desirable to avoid turning vehicle 102 into the middle lane, since vehicles from both the left lane and the right lane might enter the middle lane unexpectedly. In such circumstance, if control circuitry 116 determines vehicle 102 is traveling in the right-most lane, control circuitry 116 may determine that the middle lane fails the avoidance criteria check, but a shoulder of the highway to the right of vehicle 102 passes the avoidance criteria check.

If control circuitry 116 determines at 708 that one or more avoidance criteria checks associated both sides of vehicle 102 have failed (such as in the event that each side was determined to be free from obstacles), or one side failed the avoidance criteria check (in the event that only one side of vehicle 102 was determined to be free from obstacles) processing may proceed to 618 of FIG. 6. On the other hand, if control circuitry 116 determines at 708 that at least one side of vehicle 102 passed the avoidance criteria check, processing may proceed to 710.

At 710, control circuitry 116 may generate for output suggested steering action indicator 214 suggesting the driver maneuver to the side of vehicle 102 determined to have passed the avoidance criteria check (e.g., if that was determined to be the only side free from obstacles). If both sides of vehicle 102 are determined by control circuitry 116 to have passed the avoidance criteria check, control circuitry 116 may generate a suggested steering action indicator suggesting the driver can maneuver vehicle 102 to either of the sides, or indicating only of the sides determined to be preferable, or providing an indication that either side is acceptable but emphasizing the side determined to be preferable. For example, if control circuitry 116 determines that a lane at one of the sides has a bigger opening or more distance between vehicles in that lane for vehicle 102 to maneuver to as compared to the other side, such lane having more maneuvering space may be selected as being the preferable lane. As another example, control circuitry 116 may determine that a lane associated with a shoulder is preferable to a lane such as a middle lane of a highway, even if both lanes passed the avoidance criteria check (e.g., since it is more likely that a vehicle will unexpectedly enter the middle lane).

It will be understood that process 700 is merely illustrative and various modifications can be made within the scope of the disclosure. In some embodiments, aspects of process 700 can be incorporated into process 600 of FIG. 6. For example, one or more of the avoidance criteria checks of 708 of FIG. 7 may be checked before providing a suggested steering action indicator to a driver at 614 or 620 of FIG. 6.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:
1. A system, comprising:
one or more sensors configured to determine sensor data associated with an environment surrounding a vehicle; and
control circuitry configured to:
determine, based on the sensor data, that a first obstacle is present in front of the vehicle;
provide a first level warning associated with the first obstacle at a first time based on the sensor data;
determine, based on the sensor data, whether a second obstacle is present at a side of the vehicle; and
provide a second level warning associated with the first obstacle at a second time later than the first time based on the sensor data, wherein the second level warning comprises one or more suggested steering action indicators to avoid the first obstacle or the second obstacle.

2. The system of claim 1, wherein:
the environment surrounding the vehicle is defined by a predetermined distance from the one or more sensors;
the side of the vehicle is a first side, and the second obstacle is determined to be present at the first side of the vehicle;
the one or more suggested steering action indicators indicate one or more movements to a second side of the vehicle to avoid the first obstacle and the second obstacle; and
the wherein the second level warning is provided as an audio indicator, a tactile indicator, or a visual indicator, or any combination thereof.

3. The system of claim 1, wherein the control circuitry is further configured to:
determine, based on the sensor data, that a driver of the vehicle is not likely to perform an action corresponding to the one or more suggested steering action indicators in time to avoid the first obstacle; and
in response to determining that the driver of the vehicle is not likely to perform the action in time to avoid the first obstacle, cause the vehicle to automatically perform the action.

4. The system of claim 1, wherein:
the one or more sensors comprise a first sensor and a second sensor;
the sensor data used to determine that the first obstacle is present in front of the vehicle is received from the first sensor;
the sensor data used to determine whether the second obstacle is present at the side of the vehicle is received from the second sensor.

5. The system of claim 1, wherein the control circuitry is configured to provide the one or more suggested steering action indicators by:
generating for output tactile feedback at a portion of the vehicle to indicate a suggested direction to turn the vehicle.

6. The system of claim 1, wherein the side of the vehicle is a left side of the vehicle, and the control circuitry is further configured to:
determine that the second obstacle is not present at the left side of the vehicle;
determine that the second obstacle is not present at a right side of the vehicle; and
provide the one or more suggested steering action indicators by:
generating for display a first suggested direction to turn the vehicle to the left and a second suggested direction to turn the vehicle to the right.

7. The system of claim 1, wherein the side of the vehicle is a first side of the vehicle, and the control circuitry is further configured to:
determine that the second obstacle is not present at the first side of the vehicle; and
determine that the second obstacle is present at a second side of the vehicle; and
provide the one or more suggested steering action indicators by:
generating for display a suggested direction to turn the vehicle, wherein the suggested direction corresponds to the first side of the vehicle.

8. The system of claim 7, wherein the control circuitry is further configured to:
generate for display indications not to maneuver the vehicle to respective locations of the first obstacle and the second obstacle at the second side of the vehicle.

9. The system of claim 1, wherein:
the second level warning is provided to a heads-up display; and
the control circuitry is further configured to:
generate for display the one or more suggested steering action indicators to turn the vehicle at the heads-up display at a portion of a windshield of the vehicle; and
cause a steering wheel of the vehicle to be moved in a suggested direction corresponding to the one or more suggested steering action indicators.

10. The system of claim 1, wherein:
the second level warning is provided to a graphical user interface; and
the control circuitry is configured to:
generate for display the one or more suggested steering action indicators to turn the vehicle at the graphical user interface of a dashboard of the vehicle; and
cause a steering wheel of the vehicle to be moved in a suggested direction corresponding to the one or more suggested steering action indicators.

11. A method comprising:
determining, based on sensor data of one or more sensors, that a first obstacle is present in front of a vehicle;
providing a first level warning associated with the first obstacle at a first time based on the sensor data;
determining, based on the sensor data, whether a second obstacle is present at a side of the vehicle; and
providing a second level warning associated with the first obstacle at a second time later than the first time based on the sensor data, wherein the second level warning comprises one or more suggested steering action indicators to avoid the first obstacle or the second obstacle.

12. The method of claim 11, wherein the second level warning is provided as an audio indicator, a tactile indicator, or a visual indicator, or any combination thereof.

13. The method of claim 11, further comprising:
determining, based on the sensor data, that a driver of the vehicle is not likely to perform an action corresponding to the one or more suggested steering action indicators in time to avoid the first obstacle; and
in response to determining that the driver of the vehicle is not likely to perform the action in time to avoid the first obstacle, causing the vehicle to automatically perform the action.

14. The method of claim 11, wherein:
the one or more sensors comprise a first sensor and a second sensor;
the sensor data is associated with an environment surrounding the vehicle;
the sensor data used to determine that the first obstacle is present in front of the vehicle is received from the first sensor; and
the sensor data used to determine whether the second obstacle is present at the side of the vehicle is received from the second sensor.

15. The method of claim 11, wherein providing the one or more suggested steering action indicators comprises:
generating for output tactile feedback at a portion of the vehicle to indicate a suggested direction to turn the vehicle.

16. The method of claim 11, wherein the side of the vehicle is a left side of the vehicle, and the method further comprises:

determining that the second obstacle is not present at the left side of the vehicle;
determining that the second obstacle is not present at the right side of the vehicle; and
providing the one or more suggested steering action indicators comprises:
   generating for display a first suggested direction to turn the vehicle to the left and a second suggested direction to turn the vehicle to the right.

17. The method of claim 11, wherein the side of the vehicle is a first side of the vehicle, and the method further comprises:
determining that the second obstacle is present at the first side of the vehicle;
determining that the second obstacle is not present at the second side of the vehicle; and
providing the one or more suggested steering action indicators comprises:
   generating for display a suggested direction to turn the vehicle, wherein the suggested direction corresponds to the second side of the vehicle.

18. The method of claim 17, wherein providing the one or more suggested steering action indicators comprises:
generate for display indications not to maneuver the vehicle to respective locations of the first obstacle and the second obstacle at the second side of the vehicle.

19. The method of claim 11, wherein the vehicle comprises a heads-up display and a graphical user interface, and providing the one or more suggested steering action indicators comprises:
generating for display a suggested direction to turn the vehicle at the heads-up display at a portion of a windshield of the vehicle or at the graphical user interface of a dashboard of the vehicle; and
causing a steering wheel of the vehicle to be moved in the suggested direction corresponding to the one or more suggested steering action indicators.

20. A non-transitory computer-readable medium having non-transitory computer-readable instructions encoded thereon that, when executed by a processor, causes the processor to:
determine, based on sensor data of one or more sensors, that a first obstacle is present in front of a vehicle;
provide a first level warning associated with the first obstacle at a first time based on the sensor data;
determine, based on the sensor data, whether a second obstacle is present at a side of the vehicle; and
provide a second level warning associated with the first obstacle at a second time later than the first time based on the sensor data, wherein the second level warning comprises one or more suggested steering action indicators to avoid the first obstacle or the second obstacle.

* * * * *